United States Patent [19]
Dochterman et al.

[11] 3,758,799
[45] Sept. 11, 1973

[54] DYNAMOELECTRIC MACHINE

[75] Inventors: Richard W. Dochterman, Fort Wayne, Ind.; Michael E. Wendt, Tyler, Tex.

[73] Assignee: General Electric Company, Fort Wayne, Ind.

[22] Filed: Jan. 6, 1972

[21] Appl. No.: 215,751

Related U.S. Application Data

[63] Continuation-in-part of Ser. No. 6,666, Jan. 29, 1970, abandoned.

[52] U.S. Cl. .................................. 310/89, 310/43
[51] Int. Cl. ............................................. H02k 5/00
[58] Field of Search .............................. 310/42–45, 86–88, 89, 216, 258; 260/39 SP, 37, 41 H; 174/52.6; 264/272, 173; 156/173, 176

[56] References Cited
UNITED STATES PATENTS

| | | | |
|---|---|---|---|
| R24,909 | 12/1960 | Dochterman | 310/43 X |
| 2,948,930 | 8/1960 | Herbst | 174/52.6 X |
| 3,161,843 | 12/1964 | Hodges | 264/272 |
| 3,520,749 | 7/1970 | Rebenstein | 264/173 X |
| 3,429,981 | 2/1969 | Schallahamer | 260/37 X |
| 3,333,544 | 8/1967 | Turk | 310/86 X |
| 3,344,513 | 10/1967 | Bemmann | 264/272 X |
| 3,210,577 | 10/1965 | Hogue | 264/272 |

*Primary Examiner*—R. Skudy
*Attorney*—John M. Stoudt et al.

[57] ABSTRACT

Composite structure includes winding support with windings accommodated thereon and a housing means that does not include a metal case or shell and that does include a substantially rigid primary structural member formed of an interstitial mass of inert particulate material. Adhesive material occupies interstices of interstitial mass and bonds inert particles together and to remainder of the structure. Improved composite structure exhibits enhanced structural integrity, corrosion resistance and, even when employing refractory material such as sand as the particulate material, exhibits measurably improved heat dissipation characteristics. Composite structure also provides improved protection for winding terminations and terminals. Also disclosure of making composite structures including a particulate interstitial mass and dynamoelectric machines including such structures.

16 Claims, 20 Drawing Figures

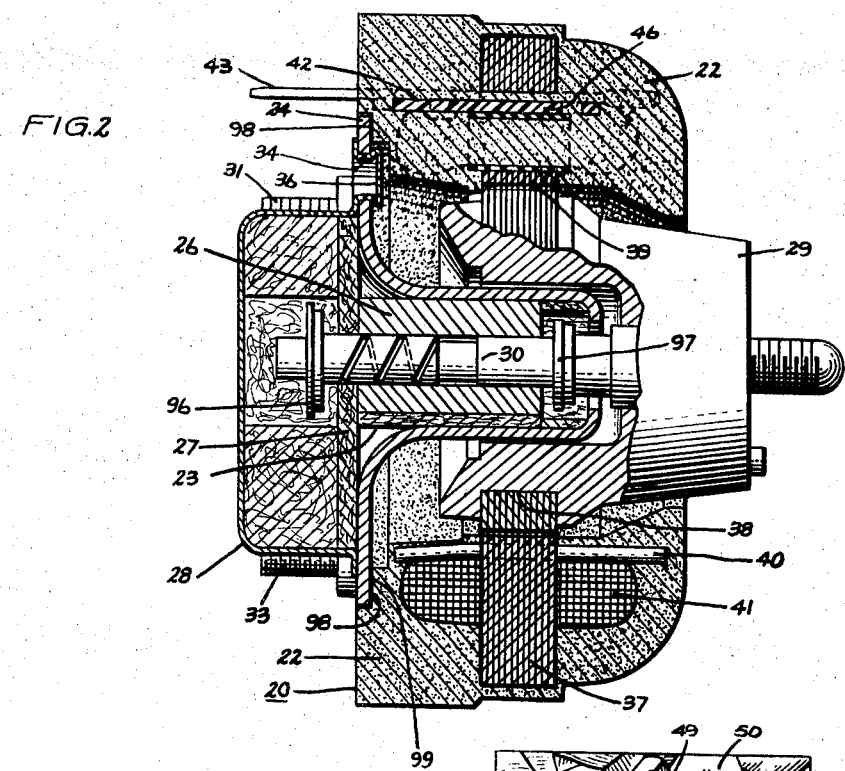
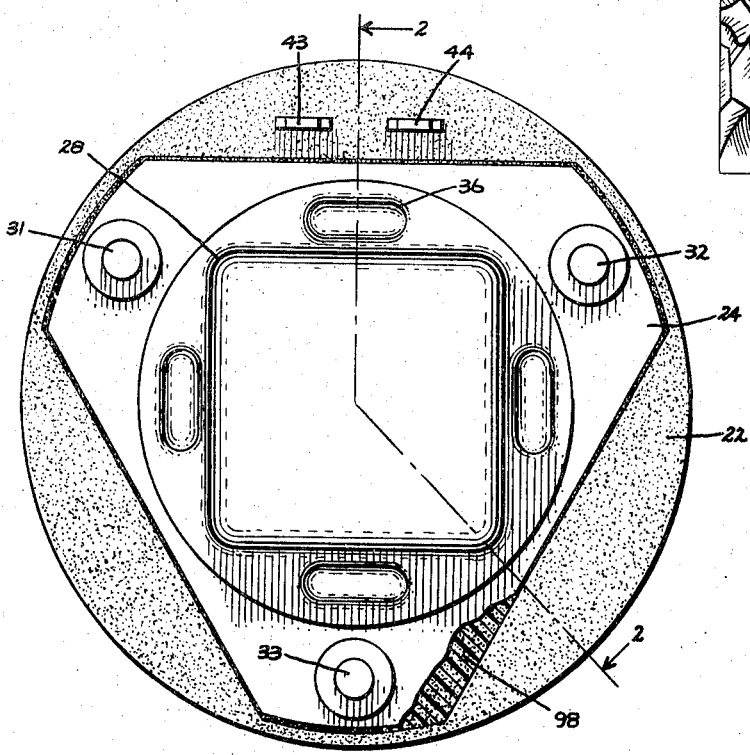
FIG.2
FIG.1
FIG.3

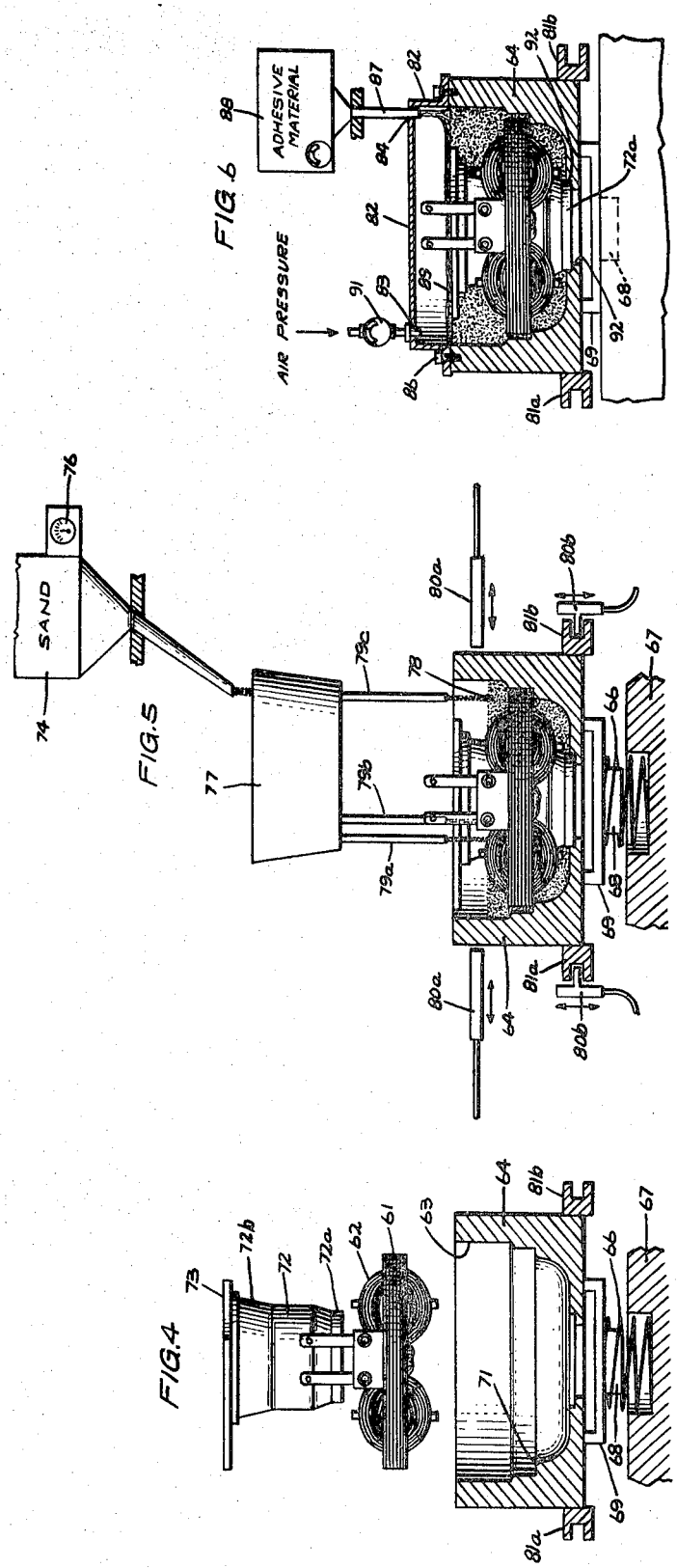

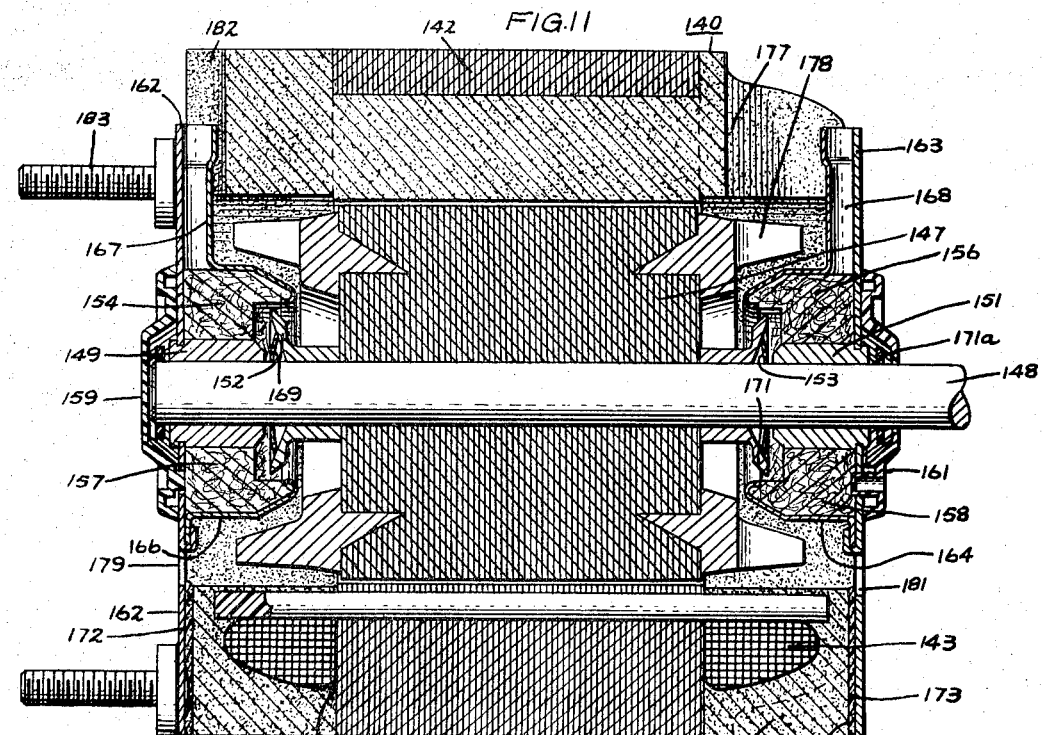
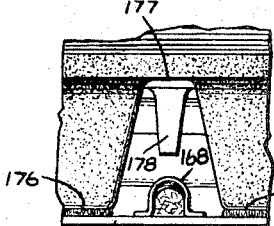
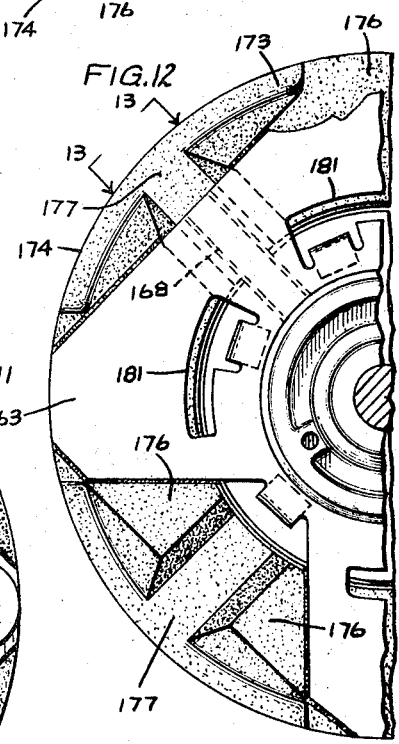
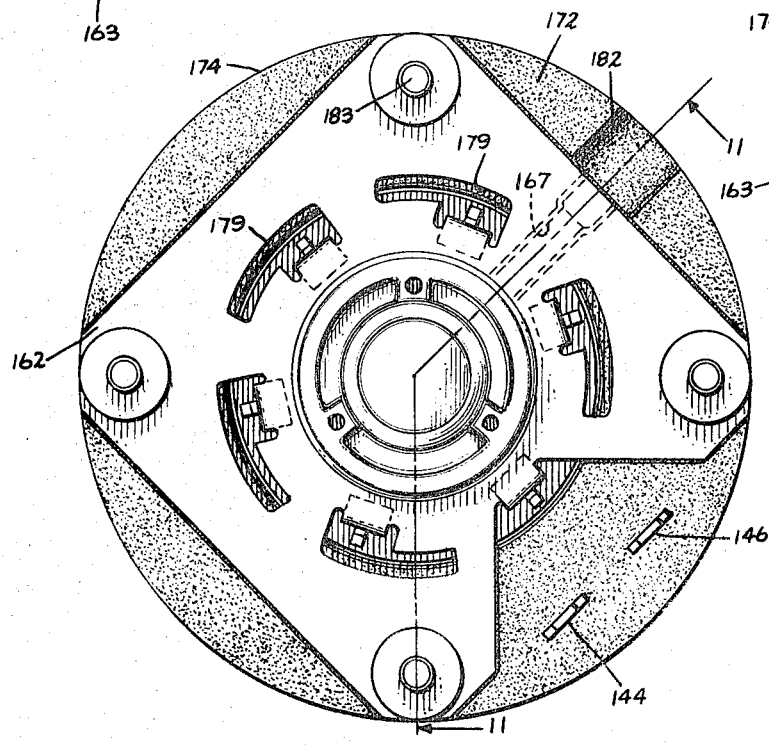

DYNAMOELECTRIC MACHINE

CROSS-REFERENCE TO RELATED APPLICATIONS

This application is a continuation-in-part of our co-pending application Ser. No. 6,666, filed Jan. 29, 1970 now abandoned.

A related application is co-pending application for "Wet Motor", Ser. No. 6,660, filed in the name of Richard W. Dochterman on Jan. 29, 1970 now abandoned. Another related application is co-pending application for "Dynamoelectric Machine Having Improved Housing, Bearing And Support Structure, And Method Of Making Same", Ser. No. 6,664, filed on Jan. 29, 1970 in the name of Richard W. Dochterman. Application Ser. No. 6,664 issued as Pat. No. 3,670,405 on June 20, 1972. All of these just mentioned applications are assigned to the assignee of this application.

BACKGROUND OF THE INVENTION

This invention relates generally to dynamoelectric machines and composite structures for use therein and, more particularly, to dynamoelectric machines having improved structural integrity and operating characteristics.

It has long been recognized that many diverse and often conflicting criteria must be satisfied by dynamoelectric machines that are reliable and efficient in operation and yet economical to manufacture. For example, motor housing means usually are formed of or at least include an exterior peripheral cover or structure normally referred to as a motor frame, case, or shell. The housing means selected must have sufficient structural integrity to protect the windings supported on a stator core from being damaged during manufacture, handling, or use of the completed machine.

In order to avoid confusion, the term "stationary composite structure" will be used herein as inclusive of a winding support (e.g., a stator core), one or more windings supported on the winding support, and means (e.g., a frame, case, or shell) used to physically surround and protect the windings and/or winding support. Accordingly, a stationary composite structure or housing means not having an exterior peripheral cover or structure would not include a frame, case, or shell.

Desirably, a stationary composite structure surrounding a rotor (which is also a "composite structure") will provide a sound insulating effect, i.e., suppress noise generated during operation of the machine. In addition, the stationary composite structure must reliably support a bearing system so that an unobstructed and predetermined air gap will be maintained between a selected surface of the stationary composite structure and a selected surface of the composite structure or rotor that is movable relative thereto during operation.

Dynamoelectric machines are often subjected to repetitive stresses such as those caused, e.g., by thermal cycling or by torque pulsation forces which are inherent in the operation of alternating current induction motors, and it is desirable that the stationary composite structure be able to sucessfully withstand such stresses. It is also desirable that means be provided to positively and reliably protect the windings and winding termination connections from damage caused by mechanical shocks, high humidity or other environmental conditions, or corrosive agents that may be encountered during operation.

Notwithstanding the foregoing desiderata, it is particularly desirable that the rapid and efficient dissipation of heat from the windings, bearing system, and rotor be promoted by at least the housing means portion of the stationary composite structure. Furthermore, the material and procedures utilized to manufacture and assemble dynamoelectric machines must be economical and consistently repeatable in order to provide a product of a consistently uniform and high quality. Desirably, such procedures involve a minimum number of steps in practice.

Many years of development and experience have resulted in a determination that there are relatively few different approaches that will yield resonably satisfactory solutions to the above and other problems. Variations of one general type of approach are illustrated, for example, in Lindt Pat. No. 3,304,448 and Kaiser Pat. No. 3,313,968, both of which are assigned to the assignee of the present invention. These patents show that formed or cast metal parts may be used to form a case, frame, or cover around one or more windings supported on a stator core.

Other approaches that have been suggested are described, for example, in the commonly assigned Avila et al. Pat. No. 3,002,261 and Thompson et al. Pat. No. 3,165,816. Included in these patents are descriptions of magnetic stator cores and stator windings surrounded by synthetic molding materials. These approaches, however, have not been generally adopted in practice because of the expense of such molding materials as compared to formed or cast metals; because of relatively large amounts of shrinkage that occur during manufacture processes involving many available molding materials; and because such materials are, by comparison with metals, effective thermal insulators and relatively less effective for dissipating the heat generated by a dynamoelectric machine. For these and other reasons the general approach, in practice, has been to use formed or cast metal parts to form external peripheral frames, cases, or shells, which are manufactured to specified dimensional tolerances in order to be satisfactorily assembled with specific stator cores and which are surprisingly susceptible to damage from physical mishandling.

SUMMARY OF THE INVENTION

Consequently, it is a primary object of the present invention to provide an improved dynamoelectric machine which solves these problems and overcome the difficulties mentioned above.

Another object of the present invention is to provide new and improved dynamoelectric machines that exhibit greatly enhanced structural integrity and that have improved heat dissipation characteristics and yet do not include peripheral frames, cases, or shells.

A further object of the present invention is to provide economically yet rigidly supported winding termination means that will not fail during testing or during normally expected use.

Yet another object of the present invention is to provide a dynamoelectric machine composite structure having good structural integrity and good heat dissipation characteristics and that may be readily provided with means for grounding a magnetic core when desired.

A still further object of the present invention is to provide improved dynamoelectric machine structures wherein critical dimensional tolerances of various members of such structures (e.g., external peripheral covers) are substantially eliminated by the elimination of such members.

In carrying out the objects of this invention in one form, we provide a dynamoelectric machine having a stationary composite structure that includes a stator assembly comprising a winding support formed by stacked laminations having a bore and a plurality of winding accommodating slots therein, and a plurality of windings accommodated in the slots of the winding support. The stationary composite structure further comprises housing means in the form of a substantially solid mass of particulate material. In the exemplification, the housing means does not include an exterior peripheral cover. The solid mass of particulate material has been shown, for purposes of illustration, as a mass of common sand particles bonded by a thermoresponsive adhesive material to each other and to the stator assembly. The sand particles are packed against the windings, winding support, and each other and form a substantially rigid interstitial mass with the adhesive material occupying the interstices of the interstitial mass. The mass is tightly knit, i.e., loose sand particles are not readily dislodged from the mass. The exemplified stationary composite structure eliminates the need for several critical dimensional tolerances required to be maintained heretofore between housings and stator assemblies, and exhibits structural integrity that surpasses conventional arrangements using formed steel and cast iron housing parts as well as good corrosion resistance. These and other characteristics are improved while maintaining, and in some cases improving, noise suppression characteristics as compared to the noise suppression characteristics of conventional steel and cast iron structures.

In spite of the fact that steel and cast iron are far superior conductors of thermal energy as compared to refractory materials in general, and sand in particular, the heat dissipation from actual embodiments of the invention is measurably better when compared with more conventional structures incorporating steel and cast iron parts.

In a more particular form of our invention, the ends of windings and winding termination means connected thereto are also surrounded and rigidly supported by the interstitial particulate mass. With this arrangement, the termination connection to the windings is practically indestructable. In still another form of the invention, at least one bearing support is secured by a substantially non-shrinking heat-hardenable adhesive material to a composite structure of the dynamoelectric machine. This permits a desirable substantially stress-free securement of the bearing support to the composite structure.

The subject matter which we regard as our invention is set forth in the appended claims. The invention itself, however, together with further objects and advantages thereof may be better understood by referring to the following more detailed description taken in conjunction with the drawings.

DESCRIPTION OF THE DRAWINGS

FIG. 1 is a rear elevation of a dynamoelectric machine embodying the invention in one form;

FIG. 2 is a view of FIG. 1 taken along the line 2—2 of FIG. 1, with parts in section and parts broken away;

FIG. 3 is a greatly enlarged representation of a photomicrograph of the surface of the stationary composite structure of the dynamoelectric machine of FIG. 1;

FIGS. 4, 5, 6, and 7 schematically represent the steps of a method which may be utilized to manufacture the dynamoelectric machine of FIG. 1;

FIG. 8 is a perspective view of a stationary composite structure manufactured according to the method graphically represented in FIGS. 4 through 7;

FIG. 10 is a rear view of another embodiment of the invention;

FIG. 11 is a sectional view taken along the line 11—11 of FIG. 10;

FIG. 12 is a front view, with parts broken away, of the embodiment of FIG. 10;

FIG. 13 is a view taken along the line 13—13 of FIG. 12;

DESCRIPTION OF THE PREFERRED EMBODIMENTS

Figure 16:
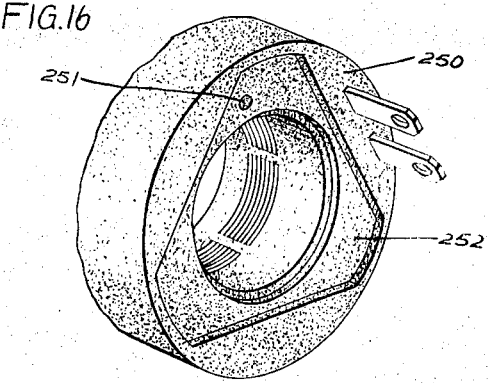
FIG. 16 is a view, with parts broken away, similar to FIG. 8, but showing a modified composite structure.

Referring now to the drawings in more detail, and in particular to the form of the invention embodied in a dynamoelectric machine as illustrated in FIGS. 1 and 2, there is illustrated a unit-bearing type motor 20 that includes a stationary composite structure 22 and a bearing system 23 that comprises a bearing support 24 secured to the stationary composite structure, a sleeve bearing 26 pressed into or otherwise secured to the bearing support, lubricating means including a feed wick 27, and an oil cover 28. The motor also includes a rotatable assembly comprising a rotor 29 and shaft 30. The rotor is built of laminated magnetic material and provided with a squirrel cage type secondary winding of conventional design. The rotor 29 is of conventional type and may be substantially similar to the rotor described in the aforementioned Lindt patent. Secured to the bearing support, by means such as spot welds, are mounting means illustrated as threaded studs 31, 32, and 33 which may be used for securing the motor to an appropriate support during operation.

The lubricating means includes conventional material (such as wool felt) disposed in a reservoir defined by the cover 28 and supplies a lubricant (e.g., motor oil) to the shaft and bearing structure of the motor through a felt feed wick 27.

The cover 28 is secured to the bearing support plate by a novel interlocking arrangement between apertures 34 on the bearing support 24 and expanded fasteners 36 formed in the cover. This arrangement and particular sleeve bearing arrangements and lubrication systems therefor are more fully disclosed and claimed in the previously identified co-pending application Ser. No. 6,664.

The stationary composite structure includes a stator assembly that is illustrated as including windings and a winding support in the form of a stator core 37 made of a plurality of stacked laminations. The stator core is of the shaded pole type, having an annular yoke section and angularly spaced apart integral teeth or salient polar projections 38 arranged inwardly of the yoke section, defining respectively enlarged winding accommodating slots between adjacent poles. The tip portions of the poles terminate in arcuate surfaces and form a rotor receiving bore 39.

The winding slots extend entirely through the stacks of laminations and accommodate the sides of windings in the form of coils 41 wound around the neck portions of the salient projections. The coils may be wound from a continuous length of suitably insulated wire, with the coils forming a four pole excitation winding in the exemplification having a predetermined number of turns arranged around each polar projection and the free ends thereof connected to the termination means 42. Elongated winding pins 40 of molded plastic or other material extend through the core and axially beyond each polar projection adjacent the bore, and serve to retain the end turns of the individual coils away from the bore.

The termination means 42 are firmly and securely embedded in the stationary composite structure 22. More specifically, conductive terminal elements 43, 44 are secured to a generally planar insulating terminal support member 46 fabricated from a sheet of electrical insulating material such as fiberboard or other suitable material; e.g., thermosetting plastic material or mica. The terminal elements each have a portion thereof attached to the support member by suitable means such as an extruded rivet or the like and portions which extend outwardly beyond the stationary composite structure. Thus, the terminal elements form quick-connect terminals exposed for connection to a source of power.

Since the termination means are firmly secured in the stationary composite structure, it is difficult, if not impossible, to dislodge the terminals 43, 44 from the structure 22. Even more importantly, it is virtually impossible to break the electrical connection between the windings and terminals. It will be understood, therefore, that the illustrated arrangement offers a significant advantage over conventional designs. In fact, a review of field rejects of one conventional type of motor has shown that about 50 percent of such field rejects result from terminal failures. That is, the terminals have become loose or electrical continuity between the terminals and windings has been broken.

As will be understood, noise is generated during operation of a motor due to the mechanical movement of the rotor in the bore. In addition, the windings and stacked laminations in motors of conventional design have a tendency to vibrate and buzz as a result of the excitation current in the windings. Furthermore, during operation, heat is generated within the stationary composite structure and bearing system of a motor. The illustrated embodiment contributes to the solution of both of these problems and operates with improved heat dissipation characteristics without degradation of noise suppression characteristics.

The stationary composite structure 22 includes housing means in the form of an interstitial mass of inert particulate material packed around the winding support, windings, and termination means. An adhesive bonding material is disposed in the interstices of the mass and bonds the inert particles into a substantially rigid mass so that the interstitial mass is a self-supporting primary structural member or element of the stationary composite structure 22. The adhesive material also bonds the substantially solid mass to the winding support, windings, and termination means. This mass is tightly knit, i.e., sand parts are not readily dislodged from the mass.

A wide range of inert particulate materials may be used in the practice of the invention. Desirably, the material selected should withstand the temperatures encountered during manufacturing operations and not deleteriously affect the winding support, windings, terminations, or insulation used on the windings or winding support. In addition, the inert material should not be electrically conductive or magnetic. In general, these same criteria also govern the selection of the particular adhesive material used as a binder for the particulate material. One type of low cost particulate material commonly available in bulk form that is particularly suitable for use is granular refractory material. Examples of this type of material are mineral ores, various kinds of rocky material, and sand.

FIG. 3 illustrates the physical structure of one preferred arrangement wherein particles of common sand are packed against each other in random fashion. FIG. 3 is drawn from a photomicrograph of the surface of the housing means portion of the stationary composite structure 22 illustrated in FIG. 1, and the thermo-responsive adhesive material disposed in the interstices of the sand mass was essentially transparent. Again, it will be appreciated that the structure is tightly knit.

However, it will be understood that as shown in FIG. 3, the interstices between adjacent particles of sand, e.g., particles 47, 48, 49, 50, are occupied by bonding material that adheres to the sand particles as well as to the stator core 37 and winding coils 41 shown in FIG. 2. The presence of small particles 51 in the structure was also observed, and these were believed to probably be extremely fine particles of sand or impurities in the sand mass.

Since the photomicrograph, of which FIG. 3 is a full scale representation, showed a 70 power enlargement of the interstitial mass, it will be appreciated that the physical interrelationships of particles such as particles 47, 48, 49, 50 are not readily apparent to the naked eye. However, the particles are packed together as illustrated with the adhesive binder filling the interstices Of the structure.

In general, the sand or other particulate material employed may have a wide range of particle sizes and particle size distribution. However, it is desirable to use particulate material wherein about fifty percent by weight of the particles have a size of from 40 to 100 mesh, and it is preferred that such material have an American Foundrymen's Society (A.F.S.) fineness of from 45 to 55, since the surface textures of structures wherein the particulate material has a grain fineness in this range is difficult to distinguish from the surface texture of permanent mold cast iron structures.

The meaning of A.F.S. grain fineness number is known in the art and is also set forth in published literature. For example, a descripJion of A.F.S. numbers is contained in the seventh edition (1963) of a book titled "Foundry Sand Handbook" and published by the American Foundrymen's Society of Des Plaines, Ill.

The calculation of A.F.S. grain fineness numbers is also set forth in this book. A sample calculation therein shows that a sieve analysis is first made of a sample for which the grain fineness number is to be calculated, using U. S. sieve sizes 6 through 270 and a pan for collecting fines. The weight of the portion of the sample retained on each sieve is then tabulated on an actual weight basis and also as a percentage by weight of the total sample weight. The percents so tabulated are then multiplied by a standard multiplier for each sieve size, and the product of such multiplication is tabulated. The sum of the recorded percentages by weight retained on the sieves and pan is then divided into the sum of the tabulated multiplication products and the result of such division is the A.F.S. grain fineness number. The multipliers for U. S. sieve numbers 6–270 and pan is tabulated in Table I below.

TABLE I

| U.S. Series Sieve Number | Multiplier |
|---|---|
| 6 | 3 |
| 12 | 5 |
| 20 | 10 |
| 30 | 20 |
| 40 | 30 |
| 50 | 40 |
| 70 | 50 |
| 100 | 70 |
| 140 | 100 |
| 200 | 140 |
| 270 | 200 |
| Pan | 300 |

The particulate material in the FIG. 1 embodiment was river bed whole grain sand having a silica ($SiO_2$) content of from 90 percent to 98 percent by weight, substantially no metallic salts or copper, up to about 2 percent by weight clay, and traces of various elements and compounds. In preparing the sand for use, we found it to be desirable to dry the sand and then discard the extremely course particles in order to eliminate variable surface textures caused by large particles and to consistently record only the dry weight of the sand used. Accordingly, the sand was dried at 400°F in a conventional Ferris wheel forced air dryer. After this treatment, the moisture content of the sand was about 0.03 percent by weight and the dust level was about 0.3 percent by weight. Thereafter, the sand particles retained on a 30 mesh screen were discarded and the remainder used in the exemplification. A sieve analysis of a sample of the sand particles used in the exemplification is set out in Table II below which is presented for purposes of illustration. Standard procedures were followed in making the sieve analysis and, since 30 mesh size particles and larger were discarded prior to the analysis, 100 percent of the samples tested passed through a 30 mesh screen. The data for two samples is presented in Table II and the last two columns in Table II represent an average value of the recorded data for the two samples.

Although sand was used in the illustrated embodiment of the invention, it will be understood that other inert particulate materials may also be used although with probably not the same economy. No reasons are known by use as to why materials such as slate; chalk; zirconia; alumina; calcuium carbonate; mica; beryllium oxide; magnesium oxide; or combinations of such materials; or naturally occurring combinations of minerals, e.g., ores, could not be used. For example, we have used chromite ore in lieu of sand to produce structures black in color and having surface textures very similar to castings of permanent mold cast iron. The structural characteristics of these structures were comparable to the preferred exemplification.

For purposes of economy, sand having the previously noted size distribution was used in the exemplification, but we have found that satisfactory results are also obtained when the particulate material particles are of substantially uniform size. The primary critera for our selection, in addition to economic factors, is the structural integrity and final appearance of the composite structures. We believe that if only particles larger than 30 mesh are used, the surface texture of the structure normally will be objectionably course and rough unless excessive amounts of adhesive materials are used to both bind the particles into a substantially solid mass and to smooth out the "valleys" between adjacent particles adjacent the surface of the mass. This in turn is uneconomical and results in what we term an objectionable "resin-rich" surface which will be described more thoroughly hereinafter in the discussion of adhesive materials.

Based on test samples, we also believe that when all of the particulate material is substantially finer than 100 mesh, there will be an objectionable loss of structural integrity of the final structure. A readily apparent manifestation of this loss is the occurrence of fissures and surface crazes in the structure after the adhesive material has hardened. It should be added, however, that structures having apparently satisfactory structural integrity (including surface texture) were obtained when substantially all of the particles of particulate material were 100 mesh size. Therefore, we believe that when a substantial percentage or all of the particulate material is finer than 100 mesh, additional means should be used to prevent the development of fissures and crazes in the final structure. By way of illustration, one material which is suitable for use as this additional means in a sand and resin structure is glass fiber such as that discussed in Rudoff et al. Pat. No. 2,820,914.

Many materials are suitable for use as a material for securing or adhesively bonding the particles of the interstitial mass together and to the winding support and windings. We have found it to be quite desirable that the material, regardless of its exact composition, have the following attributes: that it economically secure to-

TABLE II

| Screen mesh size | Percent of sample retained | | Cumulative, percent passing through | | Average | |
|---|---|---|---|---|---|---|
| | Sample A | Sample B | Sample A | Sample B | Sample reatined, percent | Cumulative passing, percent |
| 30 | 0 | 0 | 100 | 100 | 0 | 100 |
| 40 | 16 | 18 | 84 | 82 | 17 | 83 |
| 50 | 26 | 24 | 58 | 58 | 25 | 58 |
| 70 | 32 | 34 | 26 | 24 | 33 | 25 |
| 100 | 20 | 20 | 6 | 4 | 20 | 5 |
| Pan | 6 | 4 | | | 5 | | gether the inert particles into a substantially solid mass; that it secure the particles to the remainder of the composite structure; that it be compatible with and not adversely affect other component parts of the composite structure such as the electrical insulation, winding components, core, and the like (that is, it should be inert with respect to such other parts in the structure); and that it satisfactorily withstand temperatures to which it is to be subjected during fabrication, testing, and use of the completed structure. In addition, the viscosity of the adhesive material should preferably be such that it will be readily retained in the interstitial mass so as to form an essentially non-porous rigid structure after the adhesive material has hardened. We have found that two part thermoresponsive adhesive materials of the thermosetting synthetic resinous type provide these attributes.

When a two part thermosetting resinous material is employed, suitable base resins for this material may include phthalic or non-phthalic type polyesters, epoxys (e.g., bisphenol A, novolac, cycloaliphatic), certain phenolics, polybutadienes, epoxy-acrylics, and epoxy-polyester resins.

A typical two part thermosetting resinous material we have found useful in practice includes, in addition to a base resin as mentioned above, a component to increase the flexural strength of the resinous material when cured, a catalyst to shorten the time required to cure or harden the adhesive material, and an agent to facilitate removal of the composite structure from a mold.

One specific resinous material used in an exemplification included 55 parts by weight polyester resin as the base resin mixed together with 45 parts by weight of styrene (used to increase the flexural strength). To 99 parts by weight of this mixture was added 1 part by weight of a catalytic agent in the form of tertiary-butyl-perbenzoate and then 99.45 parts by weight of the foregoing 3 part mixture were mixed with 0.55 parts by weight of a mold release agent. A commercially available mold release agent is marketed under the name "Zelec" by the E. I. DuPont de Nemours and Company, Organic Chemicals Department, 7 South Dearborn St., Chicago, Ill. However, it should be specifically noted that satisfactory structures have been obtained without using any mold release agents both in TEFLON coated molds and in uncoated molds.

One commercially available polyester resin that we have used is a non-phthalic polyester comprising mono-basic and poly-basic acids and polyhydric alcohols, and sold as polyester casting compound No. 519-C-111 by Con Chemco, 1401 Severn St., Baltimore, Md. Another suitable commercially available base resin is marketed under the name "Derakane" by the Dow Chemical Co. of Midland, Mich. This particular material is described in detail in U.S. Pat. No. 3,367,992, which discusses 2-hydroxyalkyl acrylate and methacrylate dicarboxylic acid partial esters and oxyalkylated derivatives thereof. This patent issued Feb. 6, 1968 and is assigned to the Dow Chemical Co.

The primary structural member of the stationary composite structure 22 was formed using about 71.2 percent by weight of sand and 28.8 percent by weight of the adhesive material. After the pores in the sand mass were permeated by the adhesive material, the adhesive material was retained in the pores or interstices of the sand mass and hardened by heating the stationary composite structure at 190°C for 25 minutes. It will, of course, be understood that different temperatures and varying amounts of catalyst may be used to shorten or lengthen the cure time as desired.

The actual percents by weight of particulate material and adhesive material may be varied and were determined in the exemplification by comparing the physical characteristics of stationary composite structures that were made in trials during which the proportion of resinous to particulate material was varied. Since the adhesive material, particulate material, winding support, and windings are compatible with each other, the more desirable relative proportions of the materials can be determined by physical inspection and structural testing. In general, we believe that the most economical use of materials, better heat dissipation characteristics, and better structural integrity (i.e., crack-free surfaces, uniform relatively smooth surface textures, resistance to crumbling, crushing, shattering, or breaking) result when we employ a maximum amount of particulate material and a minimum amount of resinous material. When this is done, there is no more resinous material than approximately that required to occupy the voids or pores (i.e., the interstices) between adjacent particles of the particulate mass. If insufficient amounts of resinous material are used, the structure will be porous, sand particles may be scraped from the surfaces (thus, the structure will not be tightly knit throughout); and, in extreme cases, the structure will crumble or fragment when dropped.

The importance of preventing the release of even a single piece of particulate material from a surface of such structures in a motor will be appreciated when it is understood that the air gap or clearance in the bore of a motor often is nominally only about 0.011 of an inch. Thus, the presence of particulate material, and particularly abrasive refractory material such as sand in the air gap during operation of the motor would result in severe damage, if not destruction, of the motor. For example, noise, binding and freeze up of the shaft in the bearing, and locked rotor conditions may result. If too great an amount of resinous material is used, the external surfaces of the composite structure will be resin rich and be smooth and glassy in appearance. This effect is particularly objectionable when other structural elements (e.g., bearing means) are to be adhesively secured to the composite structure.

The volume of the interstitial mass is determined essentially by the apparent volume occupied by the particulate material. Thus, the density or specific gravity of the interstitial mass permeated with adhesive material is greater than the bulk density of the particulate material. For example, the bulk density of the dry sand used in the exemplification was approximately 1.6 grams per cubic centimeter. However, the density of a section of the bonded sand mass in the stationary composite structure 22 after hardening of the adhesive material was approximately 1.9 grams per cubic centimeter.

In bulk form, the sand mass used in the exemplification has an interstitial volume, i.e., porosity or pore volume of about 34 percent. Since the securing, e.g., resinous material desirably occupies the interstitial volume of the sand mass, a section of the rigid mass after curing of the resinous material would comprise, on a volumetric basis, about 34 percent of resinous material and about 66 percent of sand particles.

Some of the advantages of our invention will be better appreciated by a comparison of the characteristics of motors constructed according to the exemplification with corresponding characteristics of conventional design motors wherein cast iron and drawn steel parts formed housings for the motors. One of these characteristics is the structural integrity of a motor, e.g., the ability of the motor to withstand physical abuse without sustaining damage to the structural or electrical components thereof. One example of such abuse is the mishandling of motors during manufacture or shipment which may subject them to severe impact loading conditions.

In order to evaluate and compare the effects of impact loading conditions, 25 stationary composite structures constructed according to the exemplification and twenty-five conventional stators having a cast iron frame pressed onto a winding support were dropped from a height of four feet onto an iron block.

After the eleventh drop, about one half of the conventional stators literally fell apart and the cast iron shells separated from the stator cores. In addition, the windings in all of the conventional structures had become open circuited. The windings in the impact resistant structures corresponding to the exemplification, on the other hand, did not open after as many as 70 drops. In addition, no structural damage was observed in these structures other than spot surface bruises, or external surface spalling. Thus, the exemplified structure was impact resistant as well as self-supporting.

Motors constructed according to the exemplification also had noise suppression characteristics at least as good as motors of conventional design. In one test, motors were individually suspended by soft elastic straps and tested in an anechoic sound chamber. During the test of each motor, a microphone was placed 6 inches away from the noisiest part of each motor while it operated under no-load conditions. Then the sound pressure, in decibels, of the noise emanating from each motor was recorded. In these tests, 20 motors corresponding to the exemplification were tested and 15 cast iron frame type conventional motors were tested. Based on data recorded during these tests, statistical calculations were made which indicated that, on the average, the recorded noise levels of the conventional motors were both higher and less uniform than in the case of the exemplification type motors.

These same types of motors were then compared to determine their relative heat dissipation characteristics and, in spite of the fact that the particulate material (sand) in the stationary structures of the exemplified type motors is a relatively good heat insulator, the temperature rise of the windings in these motors was less than that of the conventional motors for a given power input. More specifically, it was determined that motors corresponding to the exemplification dissipated 0.879 watts per °C rise in winding temperature, whereas the conventional type motors dissipated 0.763 watts per °C rise in winding temperature for about a 30° rise in winding temperature above ambient. This data was obtained by determining the steady state power supplied to the motors in order to maintain a steady state winding temperature rise of 30°C for ambient temperatures of 25°C and 40°C. In addition to monitoring the winding temperature, the steady state temperatures of the exterior surfaces of the stationary composite structures were found to be 150°C for the exemplified type motors and 130°C for the conventional motors during locked rotor tests. Thus, the exemplified type structures were over 15 percent more efficient in transferring stator core heat than the conventional motors, since, for a given winding temperature rise, over 15 percent more power could be supplied to them.

It is believed that the improved heat transfer characteristics of motors constructed according to the exemplification is at least partly due to the intimate and extensive physical contact that exists between the stator assembly and interstitial mass.

It is believed that it will be evident that dimensional tolerances between machined parts and susceptibility to rust and other forms of corrosion have been reduced or eliminated with the present invention. Again, it is noted that utilization of the present invention permits the elimination of traditional shells, frames, and cases.

Now having reference to FIGS. 4-8, the steps of one method that may be used will be more particularly described. The method involves the steps of positioning a stator assembly comprising a stator core 61 and windings 62 in the cavity 63 of a mold 64 which in turn is resiliently supported by a spring 66 retained in a support 67 and surrounding a locating boss 68 carried by a frame 69 secured to the mold. In order to space the windings from the bottom of the mold cavity, the stator core is rested against a stop formed by a ledge 71 in the mold. Then a bore plug 72 having a surface configuration corresponding to the desired bore of the composite structure of FIG. 8 is positioned in the bore of the stator core 61. Attached to the bore plug is a triangular plate 73 which provides a contoured surface on the composite structure as will be more fully described hereinafter. In those cases where winding pins may project into the bore, a taper, as indicated for example at 72b on the bore plug may be used to move and hold the pins out of the bore.

After the core and windings are positioned in the mold, a predetermined amount of particulate refractory material, illustrated for purposes of exemplification as sand, is metered and distributed into the mold around the core and windings. The metering means includes a hopper 74 and a scale represented by dial 76 for indicating when a preselected amount of sand has been added to the hopper for transfer to a distributing chute 77. As a predetermined amount of sand 78 sufficient to fill the mold cavity is distributed from three filler tubes 79a, 79b, 79c and packs around the core 61, the resiliently supported mold 64 is vibrated by vibrators 80a, 80b to reduce the amount of time required to distribute and pack the sand in the spaces between adjacent turns of the windings, and between the windings and core. As will be understood, any suitable commercially available vibrators may be used. The mold is vibrated horizontally as well as vertically as shown, and the vertical vibrators 80b vibrate the mold through channel shaped plates 81a, 81b secured to the mold. The vibrations also cause a thin layer of sand to move between the ledge 71 and stator core. This results in the stator core being substantially completely surrounded by an interstitial sand mass.

After being filled with sand, the mold is transferred to a filling station as illustrated in FIG. 6. Then, a cover plate 82 provided with an air admission port 83 and resinous material admission port 84 is secured to the mold by suitable clamping means which may be a plurality of screw fasteners 86 as shown in the drawing. Thereafter, a preselected amount of resinous material is metered through a filler tube 87 from a reservoir 88 into the mold. The material 89 flows across the surface of the sand and effectively forms a pool and air seal across the top of the mold cavity.

Although the material 89 may be permitted to flow by gravity to permeate the mass in the mold, it is more desirable to accelerate the flow of the material 89 through the mass of sand 78 by increasing the pressure differential across the sand mass. Accordingly, after a pool of material 89 is formed in the mold, air at a pressure of 4-6 psig is admitted to the mold through a pressure regulator 91. This pressure forces the material 89 into the interstices of the sand mass, and the sand and material 89 are packed into the mold by the air pressure. The air initially in the interstices of the sand is vented through outlet means in the form of a gap 92 between the end 72a of the bore plug 72 and the mold. The peripheral gap 92 provided for this purpose preferably is sufficiently small to prevent sand or excessive amounts of material 89 from flowing out of the mold while a pressure differential of from 4-6 psig is maintained across the mold inlet and outlet. When sand and material 89 as described above in the preferred embodiment of FIG. 1 are used in this process, the peripheral gap is about 0.0025 of an inch.

Although it is preferable to form a pressure differential across the mold by the application of a positive pressure to the inlet side of the mold, it will be appreciated that such differential could also be formed by applying a negative pressure or vacuum to the outlet of the mold.

After the material 89 has permeated the mass within the mold cavity, excess resinous material on the top of the mold is removed, e.g., with a squeegee. The resinous material then is cured, i.e., solidified or hardened, so that a tightly knit (i.e., closely and firmly fastened together structure) self-supporting, substantially rigid, impact resistant composite structure capable of effective heat dissipation such as the structure 93 is formed. In this structure, the sand particles are held closely adjacent to one another in a resinous matrix.

When preparing to cure the material 89, the cover 82 is removed and the mold 64 is moved into an oven 94 as shown schematically in FIG. 7 where the mold and composite structure is heated at 190°C for 25 minutes. At the end of this time, the composite structure is removed from the mold as a rigid, substantially solid mass having the configuration shown in FIG. 8. It will be appreciated that the parameters of time and temperature in the over may be varied and that the temperature of 190°C and time of 25 minutes are given for exemplary purposes only.

The recessed area 95 on the structure 93 is formed by the triangular plate 73. It will be understood that this plate may have any desired configuration that would correspond with the configuration of a bearing support to be positioned thereagainst.

After a composite structure has been formed, assembly of a complete motor may be accomplished. This method will be best understood by again referring to FIGS. 1 and 2. In these figures, after the stationary composite structure 22 has been formed with the interstitial mass forming a housing means without an additional metal or metallic peripheral covering or casing, the rotor 29 is secured in assembled relation with the bearing system by lock washers 96, 97. An epoxy material 98 or other adhesive material as described, for example, in the previously mentioned Thompson et al. patent is applied to either the bearing support plate 24 or relieved stator assembly housing surface 99 underlying the support plate 24. The bearing plate is then positioned against the surface 99 while the rotor 29 is centrally positioned in the bore 39 by removable shims. After the epoxy 98 is cured, the shims are removed through the openings 34 in the bearing support plate 24. These openings are spaced around and axially aligned with the air gap around the rotor for this purpose. Then the lubrication system is assembled and covered by the cover 28 that in turn is secured to the plate 24 by means of the expanding fasteners 36 previously referred to.

After being assembled, the exterior surfaces of the motor may be prepared for painting by cleaning and etching or priming them. Thereafter, paint may be applied to the motor and dried. These steps may, however, be completely omitted if desired, since it is not necessary to apply a protective coating to the interstitial mass forming the housing for the motor 20, since this structure is resistant to corrosive agents and essentially unaffected by water. In addition, the refractory material and/or resinous material may be used to give a desired final color to the motor 20. For example, chromite ore (as previously described) will provide a structure black in color. On the other hand, white sand will provide a nearly white color, and brown river bed sands provide a buff or beige color. Desired colors may also be obtained by adding a dye or color pigment to the resinous material which then becomes the color determining component in the structure.

Figure 9:
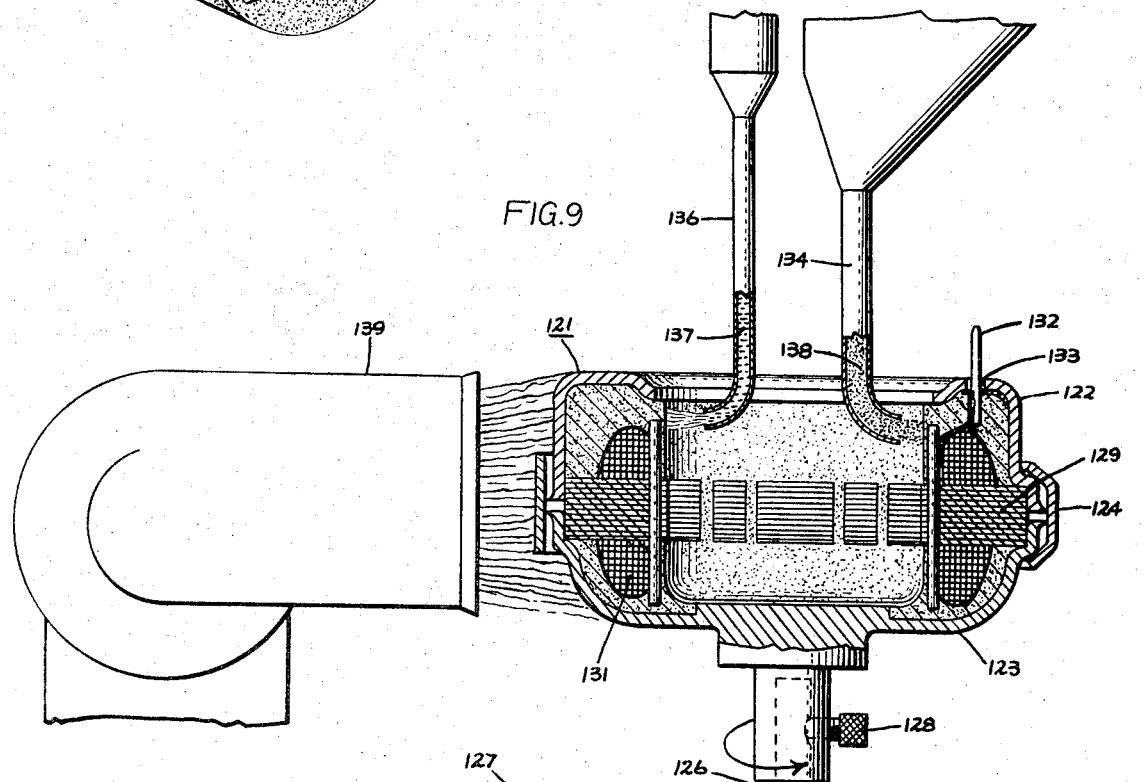
FIG. 9 is a graphical representation of another method that may be used.
Figure 20:
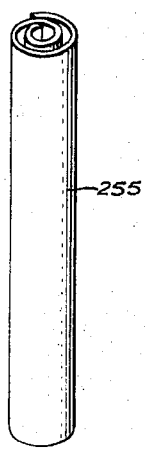
FIG. 20 is a view of another type of roll pin that may be utilized in place of the roll pin shown in FIG. 18.
Figure 19:
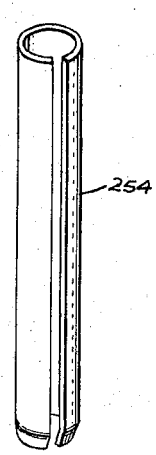
FIG. 19 is a perspective view of a roll pin of the type that is also shown in FIGS. 17 and 18.

Another method is schematically represented by FIG. 9 wherein there is illustrated a mold 121 that comprises two mold parts 122, 123 held together by a mold clamp 124 and supported on a shaft 126 of a motor 127. The mold 121 is removably secured to the shaft by a screw 128 so that it can be rotated by the motor 127. Initially, the stator core 129 with windings 131 and termination means 132 secured thereto is positioned in the lower mold part 123. Then the upper mold part 122 is positioned against the lower mold part 123 with the termination means 132 projecting through an opening 133 formed in the upper mold part. Thereafter, the mold clamp 124 is fastened in place to secure the mold parts together.

The motor 127 is energized and, as the mold 121 is rotated at a desired speed, a retractable particulate material filler nozzle 134 is moved downwardly to the position illustrated in FIG. 9 so that a predetermined amount of particulate material may be discharged into the mold. In addition, a resinous material dispensing tube 136 (also retractable) is positioned as shown in FIG. 9 to discharge the adhesive material into the cavity of mold 121. The speed of rotation of the mold may be varied, depending on the specific particulate material and particular matrix former, e.g., resinous material, being used.

When using the materials previously described for the exemplification of FIG. 1, good results are obtained when the mold is rotated at a speed of 1,600 rpm. As the sand 138 and resinous material 137 are concurrently or substantially simultaneously discharged into the rotating mold, heat is applied to the mold and transferred to the structure therewithin by means of a blower 139 which directs hot air across the mold. The centrifugal forces exerted on the sand and resinous material because of the mold rotation pack the sand and resinous material against the walls of the mold, the stator core, windings, and termination means. After predetermined amounts of sand and resinous material have been admitted to the mold, the filler tubes 134 and 136 are withdrawn from the mold, the resinous material is retained in the interstices of the sand mass, and rotation of the mold is continued until the resinous material has cured an amount sufficient to permit removal of a rigid composite structure from the mold. The final configuration of the composite structure removed from the mold is substantially the same as that of the structure 93 illustrated in FIG. 8.

Although FIG. 9 illustrates the sand 138 and material 137 being concurrently discharged into the mold, it is also possible to discharge the sand into the mold and subsequently add the adhesive material. In either case, during the cure cycle of the adhesive material, the rotational speed of the mold may be reduced to about 600 rpm after the sand and resinous material are in place without adversely affecting the structure within the mold.

FIGS. 11-13 depict still another embodiment of the invention wherein a motor 140 comprises a stationary composite structure 141 that includes a stator core 142, windings 143, terminations 144, 146, and housing means formed of an interstitial mass of particulate material. A rotor 147 of conventional construction is secured to a shaft 148 which in turn is supported for rotation by a pair of bearings 149, 151. In order to absorb end thrust during operation of the motor thrust rings, 152, 153 are also carried by the shaft 148 and co-act with the bearings. A bearing lubricant such as oil is stored in reservoirs illustrated as felt wicks 154, 156 which are retained within chambers 157, 158 formed by oil covers 159, 161, bearing supports 162, 163, and internal oil covers 164, 166. The covers 164, 166 include filler tubes 167, 168, respectively. In order to prevent loss of lubricant along the shaft 148, oil slingers 169, 171, 171a, are supported on the shaft 148 and operate in well-known fashion.

As will be appreciated from an inspection of FIGS. 10 and 12, the bearing supports 162, 163 are plates which are secured by means such as a thermosetting resinous material, e.g., epoxy, to the exposed ends 172, 173 of the interstitial mass 174 which forms the primary structural member of the motor. This interstitial mass includes a resinous material and particulate material secured to the core and windings, and is preferably made in the manner and with the materials previously described.

As best revealed in FIGS. 12 and 13, the front of the stationary composite structure is contoured so that the bearing support plate 163 is bonded to lands 176 and spaced from regions 177 of the stationary composite structure. With this arrangement, access to the oil chamber 158 through filler tube 168 is readily available and passages are provided for the flow of coolant such as air through the motor. It will be appreciated that this contouring of surfaces is now attainable as a practical alternative without requiring machining operations on the face of the stationary structure.

To further promote the flow of cooling air through the motor and permit the facile removal of shims used to center the rotor 178 in the air gap during assembly, a plurality of angularly spaced apart openings 179, 181 are formed in the support plates 162, 163, respectively in axial alignment with the air gap around the rotor.

These openings are sufficiently large to permit the removal of the shims and provide an unobstructed path to the air gap in the same manner as openings 34 in the exemplification of FIG. 1.

The face 172 of the structure 174 is contoured as shown at 182 in FIGS. 10 and 11 so as to provide access to oil filler tube 167. Although threaded studs 183 are secured to the plate 162 to illustrate means for mounting the motor during operation, it will be appreciated that other mounting means could be employed in this as well as the other embodiments described herein.

Figure 14:
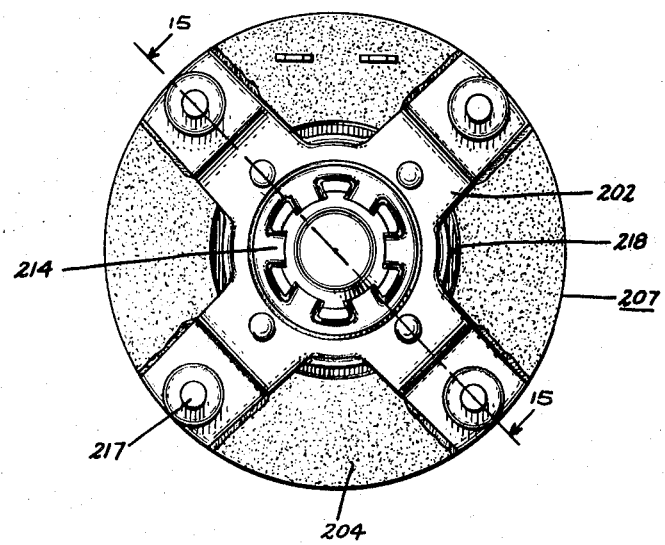
FIG. 14 is a rear view of still another embodiment of the invention.
Figure 15:
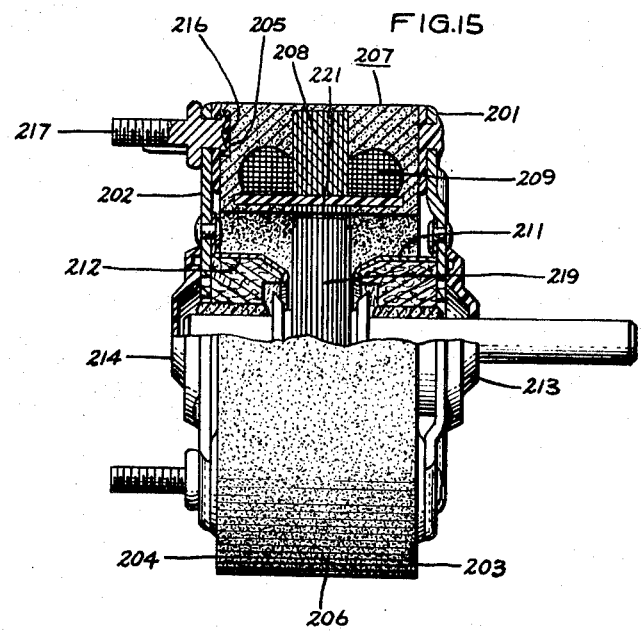
FIG. 15 is a view, partly in section and partly in full, taken along the line 15—15 of FIG. 14.

FIGS. 14 and 15 illustrate still another embodiment of the invention wherein bearing supports 201, 202 are adhesively secured to the end faces 203, 204 respectively of the housing means portion of stationary composite structure 206. The structure 206 comprises an interstitial mass of sand particles bonded together as previously described. Other components in the motor such as the stator core 208, windings 209, oil retainers 211, 212 and oil covers 213, 214 provide known advantages as will be understood.

As best shown in FIG. 15, end face 204 of the structure 206 is relieved at 205 to provide a clearance for the deformed heads 216 of threaded mounting studs 217. These studs may be riveted or welded to the bearing support 202. As in previously described embodiments, openings such as openings 218 shown in FIG. 14 are provided to permit the easy removal of shims that were used to center the rotor 219 in the air gap 221 during assembly of the rotor and stationary composite structure.

Although the bearing means illustrated herein have included a bearing secured to an end frame or bearing support of the exemplified dynamoelectric machines, it will be understood that the end frame itself may be used as a bearing means without a separate bearing element. In addition, it will be appreciated that when the particulate material is granular in form, the granules may be generally uniform in shape or non-uniform and irregular in shape as was the case of the sand particles in the exemplification.

The significance of the differences between composite structures, e.g., dynamoelectric machines embodying one form of the invention and those known heretofore, may be better appreciated by noting that, prior to being listed as "impedance protected" motors intended primarily for use as household refrigerator condenser fan motors with Underwriters' Laboratories Inc.; motors exemplifying the invention were required to meet not only the criteria set forth in U. L. No. 73 tests for motor operated appliances (published in 1967), but still other test criteria not required heretofore of other motors intended primarily for the same use.

By way of illustration, composite structures configured as shown in FIG. 8 were formed of inert particulate material in the form of sand having a 40 to 100 mesh particle size and held together by a polyester-styrene resinous material that was formulated to correspond to the material described hereinabove as "one specific resinous material used in an exemplification". These composite structures were then assembled with rotors and bearing systems to form motors of the unit bearing type shown in FIG. 1. These motors will be referred to hereinafter as "submitted motors".

Rather than being subjected to the relatively normal "Hi Pot" test wherein one test probe is touched to one or both motor terminals and another probe is touched to any part of a metal housing or case while the probes are connected across a potential of 1,240 volts; the submitted motors were subjected to a 5,000 volt hi pot test. Moreover, since the submitted motors did not have a metal shell or housing, they were wrapped in conductive metal foil and then placed in conductive shot. One probe was then placed in circuit with the shot while the other probe was touched to the terminals.

Moreover, the submitted motors were subjected to an "abnormal burn out" test. In this test, the submitted motors first passed a 15 day locked rotor test and then were wrapped in insulating material, e.g., cotton batting, cheese cloth, or polyurethane foam. Then, with the rotor locked, voltage was applied in 5 volt increments and held until the temperature of the motor housing was stable for 30 minutes or until the motor failed due to winding failure. Depending on the insulation material covering used (e.g., cotton, cloth, or foam); the submitted motors failed safely (without igniting the covering) when 120 to 130 volts were applied. In all of these tests, the housing temperature was from about 280°C to about 320°C at the time of failure.

An impact test is illustrative of still one test to which the submitted motors were subjected. In this test, a 2 inch diameter steel ball, weighing 1.18 pounds was dropped so that either 5 or 10 foot pounds of energy were applied to the motors. In this test 10 foot pounds were applied to the motors at room temperature and 5 foot pounds were applied when the motors were at minus 35°C. The submitted motors also passed these tests and were only slightly dented or chipped.

Figure 17:
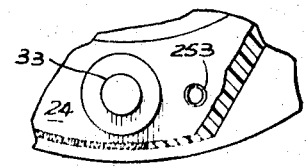
FIG. 17 is a fragmentary view corresponding to a fragment of FIG. 1 and showing an arrangement utilizing the structure of FIG. 16.
Figure 18:
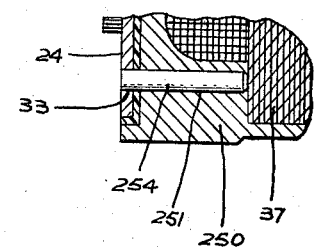
FIG. 18 is a fragmentary view corresponding to a fragment of that portion of FIG. 2 that would show, in side elevation, the structure revealed by FIG. 17.

In at least some situations, it would be desirable to reduce at least some of the "extra" tests that motors embodying the invention would be subjected to. The modified structures shown in FIGS. 16–18 illustrate one way in which the stator core 37 of a motor may be grounded and thus eliminate the need to pass a 5,000 volt hi pot test.

With reference to FIGS. 16–20, the composite structure 250 is similar in all respects to the composite structure 93 of FIG. 8 except that a hole 251 is formed therein, e.g., by a removable pin while the structure is being made. This hole is formed in the recessed surface 252 of the structure and extends to the surface of the stator core 37. A hole is also formed in the plate 24 and then, after assembly of the plate 24 (as modified) with the structure 250, a roll pin, such as pin 254 or pin 255 is driven into holes 253 and 251 to establish a ground circuit path from the core 37 to the plate 24. The pins 254 and 255 may be steel or other suitable material, as will be understood, and each are at least slightly compressible during assembly so that good electrical contact will be maintained with plate 24.

In view of the foregoing, it will be manifest that the advantages and features of our invention are numerous. For example, dynamoelectric machines embodying the invention are characterized by greatly improved structural integrity; heat dissipation characteristics; and corrosion resistance and noise suppression characteristics that are equally as good as those of motors of conventional design. Moreover, traditional housings or coverings formed of metal or otherwise are no longer needed. Furthermore, winding terminations are better protected than heretofore and critical dimensional tolerances in cast iron and/or drawn steel housing parts have been substantially eliminated. In addition, new and improved manufacturing techniques have been illustrated for producing composite structures.

In accordance with the Patent Statutes, we have described what at present are considered to be the preferred and alternate embodiments of our invention, but it will be obvious to those skilled in the art that numerous changes and modifications may be made therein without departing from the invention.

What we claim as new and desire to secure by Letters Patent of the United States is:

1. A dynamoelectric machine comprising a stator assembly; a rotor assembly including a centrally disposed shaft; at least one bearing for mounting the stator and rotor assemblies for relative motion with the shaft supported by the bearing and extending from the assemblies; and substantially rigid housing means formed without a peripheral casing therearound for connecting the at least one bearing and stator assembly together, for protecting the stator assembly from damage by impact loads applied to the dynamoelectric machine, and for aiding in the effective dissipation of heat from the stator assembly generated during operation of the dynamoelectric machine; said substantially rigid housing means including an impact resistant self-supporting substantially rigid mass of inert particulate material comprising at least about 50 percent by weight of from about 40 to 100 mesh size particles held together and secured to the stator assembly, said substantially rigid housing means comprising from about 65 to about 80 percent by weight of inert particulate material and from about 20 to about 35 percent by weight of resinous material.

2. The dynamoelectric machine of claim 1 wherein the particulate material is comprised of granular refractory material having an A.F.S. grain fineness number greater than 45.

3. The dynamoelectric machine of claim 1 wherein (said) housing means includes means for directing a cooling medium through the dynamoelectric machine thereby to further aid in the effective dissipation of heat from the stator assembly generated during operation of the dynamoelectric machine.

4. The dynamoelectric machine of claim 1 wherein (said) rotor assembly is mounted in spaced relation to the stator assembly and forms an axially extending air gap therewith and the dynamoelectric machine further comprises an end frame secured to (said) housing means; said end frame defining a number of spaced apart openings in axial alignment with said air gap to provide an unobstructed path between the air gap and said openings in the end frame, said openings being sufficiently large to permit access to the air gap for removing shim means therefrom during assembly of the dynamoelectric machine components.

5. A dynamoelectric machine comprising a stator assembly; a movable assembly including a centrally disposed shaft; at least one bearing for mounting the assemblies for relative motion with the shaft supported by the bearing and extending from the assemblies; and an impact resistant rigid mass of inert particulate material secured together and to the stator assembly by a resinous material to form a self-supporting substantially rigid housing member having no peripheral metallic covering therearound, said self-supporting substantially rigid housing member structurally interconnecting the at least one bearing and stator assembly, and providing protection for the stator assembly from impact loads that may be applied to the dynamoelectric machine without need for the peripheral metallic covering; said particulate material comprising granular refractory material having an A.F.S. grain fineness number greater than 45.

6. The dynamoelectric machine of claim 5 wherein said rigid mass comprises from about 65 to about 80 percent by weight of inert particulate material and from about 20 to about 35 percent by weight of resinous material.

7. The dynamoelectric machine of claim 5 wherein the stator assembly includes a laminated magnetic core, the movable assembly is mounted in spaced relation to the stator assembly and forms an axially extending air gap therewith, said housing member has at least one passage formed therein in communication with the magnetic core, and the dynamoelectric machine further comprises an end frame secured to the stator assembly, and an electrically conductive member disposed in the passageway to establish a conductive path between the magnetic core and end frame.

8. The dynamoelectric machine of claim 5 wherein the color of (said) substantially rigid housing member is primarily determined by the particulate material.

9. The dynamoelectric machine of claim 5 wherein the color of (said) substantially rigid housing member is primarily determined by the resinous material.

10. In a dynamoelectric machine comprising a stator assembly; a movable assembly including a shaft, means including at least one bearing for mounting the assemblies for relative motion with the shaft extending from the assemblies, and a substantially rigid housing member; the improvement comprising said housing member being formed of an impact resistant substantially rigid mass comprising from about 65 to about 80 percent by weight of inert particulate material and from about 20 to about 35 percent by weight of resinous material; said inert particulate material comprising at least about 50 percent by weight of particles smaller than 100 mesh size, with said particles being held together and secured to the stator assembly by the resinous material to form a self-supporting substantially rigid housing member having no peripheral metallic covering therearound, said self-supporting substantially rigid housing member structurally interconnecting the at least one bearing means and stator assembly, and providing protection for the stator assembly from impact loads that may be applied to the dynamoelectric machine without need for the peripheral metallic covering.

11. The dynamoelectric machine of claim 10 wherein the resinous material is a polymer formed from polyester and styrene.

12. The structure of claim 10 further including a bearing support adhesively secured to the rigid housing member.

13. A composite structure for an electric motor having a stator, a rotor supported on a shaft, and at least one bearing supporting the shaft with the shaft extending from the motor, said composite structure comprising: a magnetic core; at least one electrically conductive winding accommodated on the magnetic core; and a housing without a metallic covering for receiving at least a part of the at least one winding; said housing comprising an interstitial mass of particles packed against and secured to each other and packed against and secured to said part of the at least one winding, to form a substantially rigid member with at least 50 percent by weight of the particles having a particle size of from about 40 to 100 mesh, thereby to protect at least said part of the at least one winding from mechanical damage and to dissipate therefrom heat produced during excitation of the at least one winding without need for the metallic covering.

14. The composite structure of claim 13 including at least one terminal having a first portion thereof electrically connected to the winding and embedded in the interstitial mass of particles, and a second portion extending out of the interstitial mass of particles and being exposed for connection to a source of power.

15. The composite structure of claim 13 wherein said substantially rigid member comprises from about 65 to about 80 percent by weight of sand particles and from about 20 to about 35 percent by weight of resinous material securing the sand particles together.

16. The composite structure of claim 13 wherein the particles comprise a particulate refractory material having an A.F.S. grain fineness number greater than 45.

* * * * *